US010607227B2

(12) United States Patent
Venkatesh et al.

(10) Patent No.: US 10,607,227 B2
(45) Date of Patent: Mar. 31, 2020

(54) SYSTEM, METHOD, AND COMPUTER PROGRAM PRODUCT FOR DETECTING POTENTIAL MONEY LAUNDERING ACTIVITIES

(71) Applicant: Visa International Service Association, San Francisco, CA (US)

(72) Inventors: Karthik Venkatesh, Hayward, CA (US); Morvarid Jamalian, Cupertino, CA (US); Morhaf Mahrous, Brentwood, CA (US)

(73) Assignee: Visa International Services Association, San Francisco, CA (US)

( * ) Notice: Subject to any disclaimer, the term of this patent is extended or adjusted under 35 U.S.C. 154(b) by 180 days.

(21) Appl. No.: 15/673,912

(22) Filed: Aug. 10, 2017

(65) Prior Publication Data

US 2019/0050861 A1    Feb. 14, 2019

(51) Int. Cl.
*G06Q 40/00* (2012.01)
*G06Q 20/40* (2012.01)
*G06Q 20/32* (2012.01)
*G06Q 20/10* (2012.01)
*G06Q 20/24* (2012.01)
*G06Q 20/26* (2012.01)
*G06Q 20/34* (2012.01)

(52) U.S. Cl.
CPC ..... *G06Q 20/4016* (2013.01); *G06Q 20/3224* (2013.01); *G06Q 20/405* (2013.01); *G06Q 20/10* (2013.01); *G06Q 20/24* (2013.01); *G06Q 20/26* (2013.01); *G06Q 20/342* (2013.01)

(58) Field of Classification Search
CPC ........................................ G06Q 40/00
USPC .......................................... 705/44
See application file for complete search history.

(56) References Cited

U.S. PATENT DOCUMENTS

2005/0267827 A1\* 12/2005 Grant, Jr. ............... G06Q 40/00
                                                                705/35
2012/0284186 A1    11/2012 Lawrence
2013/0036038 A1    2/2013 Nisal et al.

\* cited by examiner

*Primary Examiner* — Ojo O Oyebisi
(74) *Attorney, Agent, or Firm* — The Webb Law Firm

(57) ABSTRACT

Provided is a computer-implemented method for detecting potential money laundering activities. The method may include determining an overall transaction product category risk score for each transaction product category of a plurality of transaction product categories, where the overall transaction product category risk score is based on transaction data, a transaction product category risk score associated with the at least one issuer institution for each transaction product category, an issuer institution risk score associated with the at least one issuer institution, and a geographic risk score associated with the at least one issuer institution, determining an overall issuer institution risk score associated with the at least one issuer institution, determining whether the overall issuer institution risk score satisfies a threshold value, generating a notification, and communicating the notification to a client device based on generating the notification. A system and computer program product are also disclosed.

18 Claims, 4 Drawing Sheets

SYSTEM, METHOD, AND COMPUTER PROGRAM PRODUCT FOR DETECTING POTENTIAL MONEY LAUNDERING ACTIVITIES

BACKGROUND OF THE INVENTION

1. Field of the Invention

This invention relates generally to systems, devices, products, apparatus, and methods for detecting potential money laundering activities and, in one particular embodiment, to a system, product, and method for detecting potential money laundering activities based on transaction data associated with transaction involving at least one issuer institution.

2. Technical Considerations

Money laundering is the process of making illegally gained proceeds appear legal. Anti-money laundering (AML) is a term that may be used by the financial and legal industries to describe legal controls that require financial institutions and other regulated entities to prevent, detect, and report money laundering activities.

In some instances, financial institutions that operate in a country generally have to follow the same AML laws and regulations as other financial institutions in that country; however, financial institutions may structure their anti-money laundering efforts slightly differently. In some instances, financial institutions may rely on AML software to meet the legal requirements for financial institutions and other regulated entities to prevent or report money laundering activities.

However, the AML software may fail to provide a financial institution with an accurate picture of potential money laundering activities. For example, a financial institution's AML software may produce a large number of inaccurate alerts regarding potential money laundering activities. In addition, the large number of inaccurate alerts may overburden financial institution's AML software and may result in an ineffective allocation of resources by the financial institution and/or by authorities based on inaccurate reporting of potential money laundering activities.

SUMMARY OF THE INVENTION

Accordingly, it is an object of the present invention to provide systems, devices, products, apparatus, and/or methods for detecting potential money laundering activities that overcomes some or all of the deficiencies of the prior art.

According to a non-limiting embodiment, provided is a computer-implemented method for detecting potential money laundering activities. The method may include receiving transaction data associated with a plurality of transactions involving at least one issuer institution, determining a transaction volume of a plurality transactions in each transaction product category of a plurality of transaction product categories, determining an overall transaction product category risk score associated with the at least one issuer institution for each transaction product category of the plurality of transaction product categories, where the overall transaction product category risk score is based on the transaction data, a transaction product category risk score associated with the at least one issuer institution for each transaction product category, wherein the transaction product category risk score is based on a transaction volume of a plurality of transactions in each transaction product category and a transaction volume range for each transaction product category of the plurality of transaction product categories, an issuer institution risk score associated with the at least one issuer institution, and a geographic risk score associated with the at least one issuer institution based on a geographic location of the at least one issuer institution.

Further, the method may include determining an overall issuer institution risk score associated with the at least one issuer institution, where determining the overall issuer institution risk score comprises determining an average of a plurality of overall transaction product category risk scores, where the plurality of overall transaction product category risk scores comprises the overall transaction product category risk score for each transaction product category of the plurality of transaction product categories, wherein the overall issuer institution risk score comprises the average of the plurality of overall transaction product category risk scores.

Additionally, the method comprises determining whether the overall issuer institution risk score associated with the at least one issuer institution satisfies a threshold value, generating a notification associated with the at least one issuer institution, and communicating the notification to a client device based on generating the notification. Generating the notification associated with the at least one issuer institution is based on at least one issuer institution risk notification rule and at least one of the following a cross border transaction ratio associated with the at least one issuer institution, a transaction volume of all transactions in the plurality of transaction product categories, a transaction volume of at least a portion of transactions in a first transaction product category of the plurality of transaction product categories, or any combination thereof. The cross border transaction ratio comprises cross border transaction data associated with a number of transactions involving the at least one issuer institution that are conducted between a first geographic location boundary and a second geographic location boundary compared to overall transaction data associated with the plurality of transactions involving at least one issuer institution. In addition, generating the notification associated with the at least one issuer institution comprises generating the notification based on determining that the overall issuer institution risk score satisfies the threshold value.

According to another non-limiting embodiment, provided is a system for detecting potential money laundering activities. The system may include at least one processor programmed or configured to determine an overall transaction product category risk score associated with at least one issuer institution for a plurality of transaction product categories, where the overall transaction product category risk score is based on transaction data associated with a plurality of transactions involving the at least one issuer institution, wherein the transaction data comprises a transaction volume of a plurality of transactions in each transaction product category of a plurality of transaction product categories, a transaction product category risk score associated with the at least one issuer institution for each transaction product category, wherein the transaction product category risk score is based on the transaction volume of the plurality of transactions in each transaction product category and a transaction volume range for each transaction product category of the plurality of transaction product categories, at least one issuer institution risk score associated with the at least one issuer institution, and a geographic risk score of a geographic location of the at least one issuer institution.

Further, the at least one processor is programmed or configured to determine an overall issuer institution risk score associated with the at least one issuer institution based on determining the overall transaction product category risk score, where the at least one processor, when determining the overall issuer institution risk score associated with the at least one issuer institution, is programmed or configured to determine an average of a plurality of overall transaction product category risk scores, wherein the plurality of overall transaction product category risk scores comprises the overall transaction product category risk score for each transaction product category of the plurality of transaction product categories, wherein the overall issuer institution risk score comprises the average of the plurality of overall transaction product category risk scores.

Further, the at least one processor is programmed or configured to determine that the overall issuer institution risk score associated with the at least one issuer institution satisfies a threshold value, generate a notification associated with the at least one issuer institution based on at least one issuer institution risk notification rule and at least one of the following a cross border transaction ratio of transactions associated with the at least one issuer institution, a first transaction volume of all transactions in the plurality of transaction product categories, a second transaction volume of all transactions for a subcategory of a first transaction product category, or any combination thereof, and communicate the notification to the at least one issuer institution after determining that the overall issuer institution risk score associated with the at least one issuer institution satisfies the threshold value. The cross border transaction ratio of transactions comprises cross border transaction data associated with a number of transactions that are conducted between a first geographic location boundary and a second geographic location boundary compared to overall transaction data associated with an overall number of transactions conducted by the at least one issuer institution.

According to a further non-limiting embodiment, provided is a computer program product for detecting potential money laundering activities. The computer program product may include one or more computer-readable mediums storing instructions that include one or more instructions that, when executed by at least one processor, cause the at least one processor to determine an overall transaction product category risk score associated with at least one issuer institution for a plurality of transaction product categories, wherein the overall transaction product category risk score is based on transaction data associated with a plurality of transactions involving the at least one issuer institution, wherein the transaction data comprises a transaction volume of a plurality of transactions in each transaction product category of a plurality of transaction product categories, a transaction product category risk score associated with the at least one issuer institution for each transaction product category, wherein the transaction product category risk score is based on the transaction volume of the plurality of transactions in each transaction product category and a transaction volume range for each transaction product category of the plurality of transaction product categories, at least one issuer institution risk score associated with the at least one issuer institution, and a geographic risk score of a geographic location of the at least one issuer institution.

Further, the one or more instructions, when executed by at least one processor, cause the at least one processor to determine an overall issuer institution risk score associated with the at least one issuer institution based on determining the overall transaction product category risk score. The one or more instructions, that cause the at least one processor to determine the overall issuer institution risk score associated with the at least one issuer institution, cause the at least one processor to determine an average of a plurality of overall transaction product category risk scores, wherein the plurality of overall transaction product category risk scores comprises the overall transaction product category risk score for each transaction product category of the plurality of transaction product categories, where the overall issuer institution risk score comprises the average of the plurality of overall transaction product category risk scores.

Additionally, the one or more instructions, when executed by at least one processor, cause the at least one processor to generate an notification associated with the at least one issuer institution based on at least one issuer institution risk notification rule and at least one of the following a cross border transaction ratio of transactions associated with the at least one issuer institution and communicate the notification to a client device based on generating the notification associated with the at least one issuer institution. The cross border ratio of transactions comprises cross border transaction data associated with a plurality of transactions that are conducted between a first geographic location boundary and a second geographic location boundary compared to overall transaction data associated with an overall number of transactions conducted by the at least one issuer institution, a first transaction volume of all transactions in the plurality of transaction product categories, a second transaction volume of all transactions in a first transaction product category of the plurality of transaction product categories, or any combination thereof.

Further embodiments or aspects are set forth in the following numbered clauses:

Clause 1: A method for detecting potential money laundering activities, comprising: receiving transaction data associated with a plurality of transactions involving at least one issuer institution; determining a transaction volume of a plurality transactions in each transaction product category of a plurality of transaction product categories; determining an overall transaction product category risk score associated with the at least one issuer institution for each transaction product category of the plurality of transaction product categories, wherein the overall transaction product category risk score is based on: the transaction data, a transaction product category risk score associated with the at least one issuer institution for each transaction product category, wherein the transaction product category risk score is based on a transaction volume of a plurality of transactions in each transaction product category and a transaction volume range for each transaction product category of the plurality of transaction product categories, an issuer institution risk score associated with the at least one issuer institution, and a geographic risk score associated with the at least one issuer institution based on a geographic location of the at least one issuer institution; and determining an overall issuer institution risk score associated with the at least one issuer institution, wherein determining the overall issuer institution risk score comprises: determining an average of a plurality of overall transaction product category risk scores, wherein the plurality of overall transaction product category risk scores comprises the overall transaction product category risk score for each transaction product category of the plurality of transaction product categories, wherein the overall issuer institution risk score comprises the average of the plurality of overall transaction product category risk scores; determining whether the overall issuer institution risk score associated with the at least one issuer institution satisfies a threshold value; generating a notification associated with the at least one issuer institution based on at least one issuer institution risk notification rule and at least one of the following: a cross border transaction ratio associated with the at least one issuer institution, wherein the cross border transaction ratio comprises cross border transaction data associated with a number of transactions involving the at least one issuer institution that are conducted between a first geographic location boundary and a second geographic location boundary compared to overall transaction data associated with the plurality of transactions involving at least one issuer institution, a transaction volume of all transactions in the plurality of transaction product categories, a transaction volume of at least a portion of transactions in a first transaction product category of the plurality of transaction product categories, or any combination thereof, wherein generating the notification associated with the at least one issuer institution comprises generating the notification based on determining that the overall issuer institution risk score satisfies the threshold value; and communicating the notification to a client device based on generating the notification.

Clause 2: The method of clause 1, wherein each transaction product category of the plurality of transaction product categories comprises at least one of the following: a credit transaction product category, a debit transaction product category, a prepaid card transaction product category, an electronic fund transfer (EFT) transaction product category, or any combination thereof.

Clause 3: The method of clause 1 or 2, further comprising: determining the geographic location of the at least one issuer institution based on the transaction data; wherein the client device is associated with the at least one issuer institution, and wherein communicating the notification to the client device comprises: communicating the notification to the client device associated with the at least one issuer institution based on the geographic location of the at least one issuer institution.

Clause 4: The method of any of clauses 1-3, wherein the geographic location comprises a country, and wherein the first geographic location boundary comprises a boundary of a first country and the second geographic location boundary comprises a boundary of a second country.

Clause 5: The method of any of clauses 1-4, further comprising: determining a bank identification number (BIN) associated with the at least one issuer institution for each transaction of the plurality of transactions, wherein the BIN for each transaction is associated with a second transaction product category of the plurality of transaction product categories; and wherein determining the overall transaction product category risk score associated with the at least one issuer institution for each transaction product category of the plurality of transaction product categories comprises: determining the overall transaction product category risk score for the BIN associated with the second transaction product category of the plurality of transaction product categories.

Clause 6: The method of any of clauses 1-5, wherein the at least one issuer institution is a plurality of issuer institutions located in a plurality of geographic locations, the method further comprising: determining an average of a plurality of overall issuer institution risk scores associated with a plurality of issuer institutions located in a first geographic location to provide a first overall geographic risk score for the first geographic location; determining an average of a plurality of overall issuer institution risk scores associated with a plurality of issuer institutions located in a second geographic location to provide a second overall geographic risk score for the second geographic location; and generating a map comprising the first geographic location and the second geographic location, wherein the map comprises a first indication associated with the first overall geographic risk score for the first geographic location and a second indication associated with the second overall geographic risk score for the second geographic location.

Clause 7: The method of any of clauses 1-6, further comprising: determining the transaction volume of the plurality of transactions in each transaction product category.

Clause 8: The method of any of clauses 1-7, further comprising: causing at least one remedial action associated with the at least one issuer institution to occur based on communicating the notification.

Clause 9: The method of any of clauses 1-8, wherein causing the least one remedial action associated with the at least one issuer institution to occur comprises: preventing at least one transaction involving the at least one issuer institution from being processed.

Clause 10: The method of any of clauses 1-9, wherein the cross border transaction data comprises a cross border transaction volume of the number of transactions that are conducted between the first geographic location boundary and the second geographic location boundary during a predetermined time interval, and wherein the overall transaction data comprises an overall transaction volume of the plurality of transactions involving the at least one issuer institution that are conducted during the predetermined time interval.

Clause 11: The method of any of clauses 1-10, wherein generating the notification associated with the at least one issuer institution comprises: generating the notification associated with the at least one issuer institution based on at least one issuer institution risk notification rule and the following: a cross border transaction ratio of a plurality of transactions involving the at least one issuer institution, wherein the cross border transaction ratio comprises cross border transaction data associated with a plurality of transactions that are conducted between a first geographic location boundary and a second geographic location boundary compared to the transaction data associated with the plurality of transactions involving the at least one issuer institution, an overall transaction of the plurality of transaction product categories, and an overall transaction of a subcategory of a first transaction product category of the plurality of transaction product categories.

Clause 12: The method of any of clauses 1-11, wherein the transaction volume of the subcategory of the first transaction product category comprises a transaction volume of all automated teller machine (ATM) cash transactions involving the at least one issuer institution and conducted during a predetermined time interval.

Clause 13: The method of any of clauses 1-12, further comprising: determining a transaction volume of all transactions in a subcategory of the first transaction product category of the plurality of transaction product categories; wherein generating the notification associated with the at least one issuer institution comprises: generating the notification associated with the least one issuer institution so that the notification comprises the transaction volume of all transactions in the subcategory of the first transaction product category.

Clause 14: A system for detecting potential money laundering activities, comprising: at least one processor programmed or configured to: determine an overall transaction product category risk score associated with at least one issuer institution for a plurality of transaction product categories, wherein the overall transaction product category risk score is based on: transaction data associated with a plurality of transactions involving the at least one issuer institution, wherein the transaction data comprises a transaction volume of a plurality of transactions in each transaction product category of a plurality of transaction product categories, a transaction product category risk score associated with the at least one issuer institution for each transaction product category, wherein the transaction product category risk score is based on the transaction volume of the plurality of transactions in each transaction product category and a transaction volume range for each transaction product category of the plurality of transaction product categories, at least one issuer institution risk score associated with the at least one issuer institution, and a geographic risk score of a geographic location of the at least one issuer institution; and determine an overall issuer institution risk score associated with the at least one issuer institution based on determining the overall transaction product category risk score, wherein the at least one processor, when determining the overall issuer institution risk score associated with the at least one issuer institution, is programmed or configured to: determine an average of a plurality of overall transaction product category risk scores, wherein the plurality of overall transaction product category risk scores comprises the overall transaction product category risk score for each transaction product category of the plurality of transaction product categories, wherein the overall issuer institution risk score comprises the average of the plurality of overall transaction product category risk scores; determine that the overall issuer institution risk score associated with the at least one issuer institution satisfies a threshold value; generate a notification associated with the at least one issuer institution based on at least one issuer institution risk notification rule and at least one of the following: a cross border transaction ratio of transactions associated with the at least one issuer institution, wherein the cross border transaction ratio of transactions comprises cross border transaction data associated with a number of transactions that are conducted between a first geographic location boundary and a second geographic location boundary compared to overall transaction data associated with an overall number of transactions conducted by the at least one issuer institution, a first transaction volume of all transactions in the plurality of transaction product categories, a second transaction volume of all transactions for a subcategory of a first transaction product category, or any combination thereof; and communicate the notification to the at least one issuer institution after determining that the overall issuer institution risk score associated with the at least one issuer institution satisfies the threshold value.

Clause 15: The system of clause 14, wherein the at least one processor is further programmed or configured to: receive the transaction data associated with the plurality of transactions involving the at least one issuer institution; and determine the transaction volume of the plurality of transactions in each transaction product category of the plurality of transaction product categories based on receiving the transaction data; and wherein the at least on processor, when determining the overall transaction product category risk score, is programmed or configured to: determine the overall transaction product category risk score associated with the at least one issuer institution for the plurality of transaction product categories based on determining the transaction volume of the plurality of transactions in each transaction product category.

Clause 16: The system of clause 14 or 15, wherein each transaction product category of the plurality of transaction product categories comprises at least one of the following: a credit transaction product category, a debit transaction product category, a prepaid card transaction product category, an electronic fund transfer (EFT) transaction product category, or any combination thereof.

Clause 17: The system of any one of clauses 14-16, wherein the at least one processor is further programmed or configured to: determine the geographic location of the at least one issuer institution based on the transaction data; and wherein the at least one processor, when communicating the notification to the at least one issuer institution, is programmed or configured to: communicate the notification to the at least one issuer institution based on the geographic location of the at least one issuer institution.

Clause 18: A computer program product for detecting potential money laundering activities, the computer program product comprising one or more computer-readable mediums storing instructions comprising: one or more instructions that, when executed by at least one processor, cause the at least one processor to: determine an overall transaction product category risk score associated with at least one issuer institution for a plurality of transaction product categories, wherein the overall transaction product category risk score is based on: transaction data associated with a plurality of transactions involving the at least one issuer institution, wherein the transaction data comprises a transaction volume of a plurality of transactions in each transaction product category of a plurality of transaction product categories, a transaction product category risk score associated with the at least one issuer institution for each transaction product category, wherein the transaction product category risk score is based on the transaction volume of the plurality of transactions in each transaction product category and a transaction volume range for each transaction product category of the plurality of transaction product categories, at least one issuer institution risk score associated with the at least one issuer institution, and a geographic risk score of a geographic location of the at least one issuer institution; determine an overall issuer institution risk score associated with the at least one issuer institution based on determining the overall transaction product category risk score, wherein the one or more instructions, that cause the at least one processor to determine the overall issuer institution risk score associated with the at least one issuer institution, cause the at least one processor to: determine an average of a plurality of overall transaction product category risk scores, wherein the plurality of overall transaction product category risk scores comprises the overall transaction product category risk score for each transaction product category of the plurality of transaction product categories, wherein the overall issuer institution risk score comprises the average of the plurality of overall transaction product category risk scores; generate an notification associated with the at least one issuer institution based on at least one issuer institution risk notification rule and at least one of the following: a cross border transaction ratio of transactions associated with the at least one issuer institution, wherein the cross border ratio of transactions comprises cross border transaction data associated with a plurality of transactions that are conducted between a first geographic location boundary and a second geographic location boundary compared to overall transaction data associated with an overall number of transactions conducted by the at least one issuer institution, a first transaction volume of all transactions in the plurality of transaction product categories, a second transaction volume of all transactions in a first transaction product category of the plurality of transaction product categories, or any combination thereof; and communicate the notification to a client device based on generating the notification associated with the at least one issuer institution.

Clause 19: The computer program product of clause 18, wherein the one or more instructions, that cause the at least one processor to generate the notification associated with the at least one issuer institution, cause the at least one processor to: generate the notification associated with the at least one issuer institution based on the at least one issuer institution risk notification rule and the following: the cross border transaction ratio of transactions associated with the at least one issuer institution, the first transaction volume, and the second transaction volume.

Clause 20: The computer program product of clause 18 or 19, wherein the one or more instructions further cause the at least one processor to: cause at least one remedial action associated with the at least one issuer institution to occur based on communicating the notification to the at least one issuer institution.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
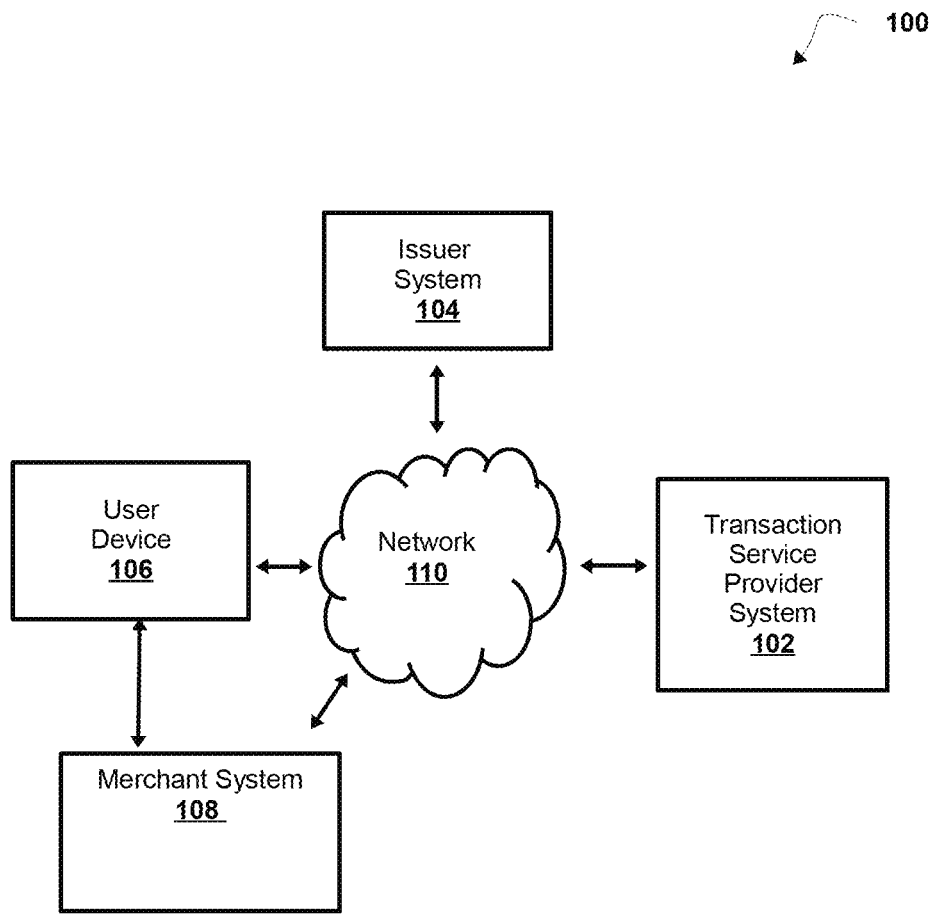
FIG. 1 is a diagram of a non-limiting embodiment of an environment in which systems, devices, products, apparatus, and/or methods, described herein, may implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. It will be appreciated that numerous other arrangements are possible.

As used herein, the terms "issuer institution," "portable financial device issuer," "issuer," or "issuer bank" may refer to one or more entities (e.g., a financial institution, a bank, a credit card issuer, a debit card issuer, and/or the like) that provide accounts to users (e.g., customers, consumers, and/or the like) for conducting (e.g., initiating, engaging in, processing, and/or the like) transactions (e.g., payment transactions, credit payment transactions, debit payment transactions, prepaid card payment transactions, cash withdrawal transactions, automated teller machine (ATM) transactions, ATM cash transactions, electronic fund transfer (EFT) transactions, and/or the like). For example, an issuer institution may provide an account identifier, such as a personal account number (PAN), to a user that uniquely identifies one or more accounts associated with the user. The account identifier may be embodied on a portable financial device (e.g., a physical financial instrument, a payment card, and/or the like). Additionally or alternatively, the account identifier may be electronic and used for electronic transactions (electronic payment transactions, and/or the like). The terms "issuer institution", "issuer system", and "issuer institution system" may also refer to one or more computer systems operated by or on behalf of the one or more entities that provide accounts to users. The one or more computer systems may include one or more computer devices, one or more servers, and/or the like executing one or more software applications. In some non-limiting embodiments, an issuer institution system may include one or more authorization servers for authorizing transactions.

As used herein, the term "account identifier" may include one or more identifiers associated with an account of a user that identifies the account of the user. For example, an account identifier may include one or more PANs, one or more tokens, and/or the like. Account identifiers may be alphanumeric or any combination of characters and/or symbols. In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be a supplemental account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution. For example, an account identifier may be a token that maps to a PAN or other identifier.

As used herein, the term "token" may refer to an identifier that is used as a substitute or replacement identifier for an account identifier, such as a PAN. Tokens may be associated with an account identifier (e.g., a PAN) in one or more data structures such that they can be used to conduct a transaction (e.g., a payment transaction) without directly using the account identifier. In some examples, an account identifier, such as a PAN, may be associated with a plurality of tokens for different uses or different purposes. A token may refer to an identifier (e.g., an electronic identifier) that is used as a substitute or replacement identifier for an account identifier (e.g., an original account identifier), such as a PAN. In some examples, an account identifier, such as a PAN, may be associated with a plurality of tokens and each token may be used for different individuals or for different purposes. An issuer institution may be associated with a bank identification number (BIN) that uniquely identifies it.

As used herein, the term "merchant" may refer to one or more entities (e.g., operators of retail businesses that provides goods and/or services, and/or access to goods and/or services, to a user (e.g., a customer, a consumer, a customer of the merchant, and/or the like) based on a transaction (e.g., a payment transaction). As used herein "merchant system" may refer to one or more computer systems operated by or on behalf of a merchant, such as a server computer executing one or more software applications. As used herein, the term "product" may refer to one or more goods and/or services offered by a merchant.

As used herein, a "point of sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant, a pager, a security card, a computer, an access card, a wireless terminal, a transponder, and/or the like. In some non-limiting embodiments, the portable financial device may include a volatile or a non-volatile memory to store information (e.g., an account identifier, a name of the account holder, and/or the like).

As used herein, the terms "client" and "client device" may refer to one or more client-side devices or systems (e.g., devices or systems that are remote from a server) used to initiate or facilitate a transaction (e.g., a payment transaction). As an example, a client device may refer to one or more POS devices used by a merchant, one or more acquirer host computers used by an acquirer, one or more user devices (e.g., one or more mobile devices) used by a user, and/or the like. In some non-limiting embodiments, a client device may be an electronic device configured to communicate with one or more networks and initiate or facilitate transactions. For example, a client device may include one or more computers, portable computers, tablet computers, cellular phones, wearable devices (e.g., watches, glasses, lenses, clothing, and/or the like), personal digital assistants (PDAs), and/or the like. Moreover, a client may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the present invention are directed to systems, methods, and computer program products for detecting potential money laundering activities. Non-limiting embodiments of the invention allow for improvements in the accuracy of notifications that may be communicated regarding potential money laundering activities. In addition, non-limiting embodiments of the invention allow for the reduction of in the amount of network resources and processing resources associated with communicating notifications regarding potential money laundering activities.

Non-limiting embodiments of the present invention may include a computer-implemented method that comprises determining an overall transaction product category risk score associated with the at least one issuer institution for each transaction product category of the plurality of transaction product categories, where the overall transaction product category risk score is based on transaction data associated with a plurality of transactions involving at least one issuer institution, a transaction product category risk score associated with the at least one issuer institution for each transaction product category, an issuer institution risk score associated with the at least one issuer institution, and a geographic risk score associated with the at least one issuer institution based on a geographic location of the at least one issuer institution.

Additionally, the method may include determining an overall issuer institution risk score associated with the at least one issuer institution by determining an average of a plurality of overall transaction product category risk scores, wherein the plurality of overall transaction product category risk scores comprises the overall transaction product category risk score for each transaction product category of the plurality of transaction product categories, where the overall issuer institution risk score comprises the average of the plurality of overall transaction product category risk scores.

Furthermore, the method may include generating a notification associated with the at least one issuer institution based on at least one issuer institution risk notification rule and at least one of a cross border transaction ratio of transactions associated with the at least one issuer institution, the overall transaction data associated with a transaction volume of all transactions in the plurality of transaction product categories, a transaction volume of at least a portion of transactions in a first transaction product category of the plurality of transaction product categories, or any combination thereof, and communicating the notification to a client device based on generating the notification. The cross border ratio may include cross border transaction data associated with a number of transactions involving the at least one issuer institution that are conducted between a first geographic location boundary and a second geographic location boundary compared to overall transaction data associated with an overall number of transactions involving the at least one issuer institution.

In this way, the accuracy of notifications regarding potential money laundering activities may be increased. Further, processor and network resources may be reduced as compared to communicating notifications based on information other than the overall issuer institution risk score and the at least one issuer institution risk notification rule.

Referring now to FIG. 1, FIG. 1 is a diagram of a non-limiting embodiment of an environment 100 in which systems, devices, products, apparatus, and/or methods, as described herein, may be implemented. As shown in FIG. 1, environment 100 includes transaction service provider system 102, issuer system 104, user device 106, merchant system 108, and network 110.

Transaction service provider system 102 may include one or more devices capable of receiving information from and/or communicating information to issuer system 104, user device 106, and/or merchant system 108, via network 110. For example, transaction service provider system 102 may include one or more computing devices, a server, a group of servers, and/or the like. In some non-limiting embodiments, transaction service provider system 102 may be associated with an entity (e.g., a transaction service provider) that operates a credit card network and that processes payments for credit accounts, debit accounts, credit cards, debit cards, and/or the like.

Issuer system 104 may include one or more devices capable of receiving information from and/or communicating information to transaction service provider system 102, user device 106, and/or merchant system 108, via network 110. For example, issuer system 104 may include one or more computing devices, a server, a group of servers, and/or the like. In some non-limiting embodiments, the issuer system 104 may be associated with an issuer institution as described herein. In some non-limiting embodiments, issuer system 104 may be associated with an issuer institution that issued an account (e.g., a credit account, a debit account, a credit card account, a debit card account, and/or the like) to a user associated with user device 106.

User device 106 may include one or more devices capable of receiving information from and/or communicating information to transaction service provider system 102, issuer system 104, and/or merchant system 108, via network 110. For example, user device 106 may include a client device, a computer device, a desktop computer, a mobile device, and/or the like.

Merchant system 108 may include one or more devices capable of receiving information from and/or communicating information to transaction service provider system 102, issuer system 104, and/or user device 106, via network 110. For example, merchant system 108 may include a computing device, a server, a group of servers, a client device, a group of client devices, and/or the like. In some non-limiting embodiments, merchant system 108 may be associated with a merchant as described herein. In some non-limiting embodiments, merchant system 108 may include one or more user devices 106. For example, merchant system 108 may include user device 106 that allows a merchant associated with merchant system 108 to receive information from and/or communicate information to transaction service provider system 102.

In some non-limiting embodiments, merchant system 108 may be capable of being used by a merchant to conduct (e.g., initiate, engage in, process, and/or the like) a payment transaction with a user associated with user device 106. For example, merchant system 108 may include one or more computers, servers, input devices, payment terminals, magnetic stripe card readers, chip card readers, contactless transceivers, contactless receivers, NFC receivers, RFID receivers, contact-based receivers, and/or the like.

Network 110 may include one or more wired and/or wireless networks. For example, network 110 may include a cellular network (e.g., a long-term evolution (LTE) network, a third generation (3G) network, a fourth generation (4G)

network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of environment 100 may perform one or more functions described as being performed by another set of systems or another set of devices of environment 100.

Figure 2:
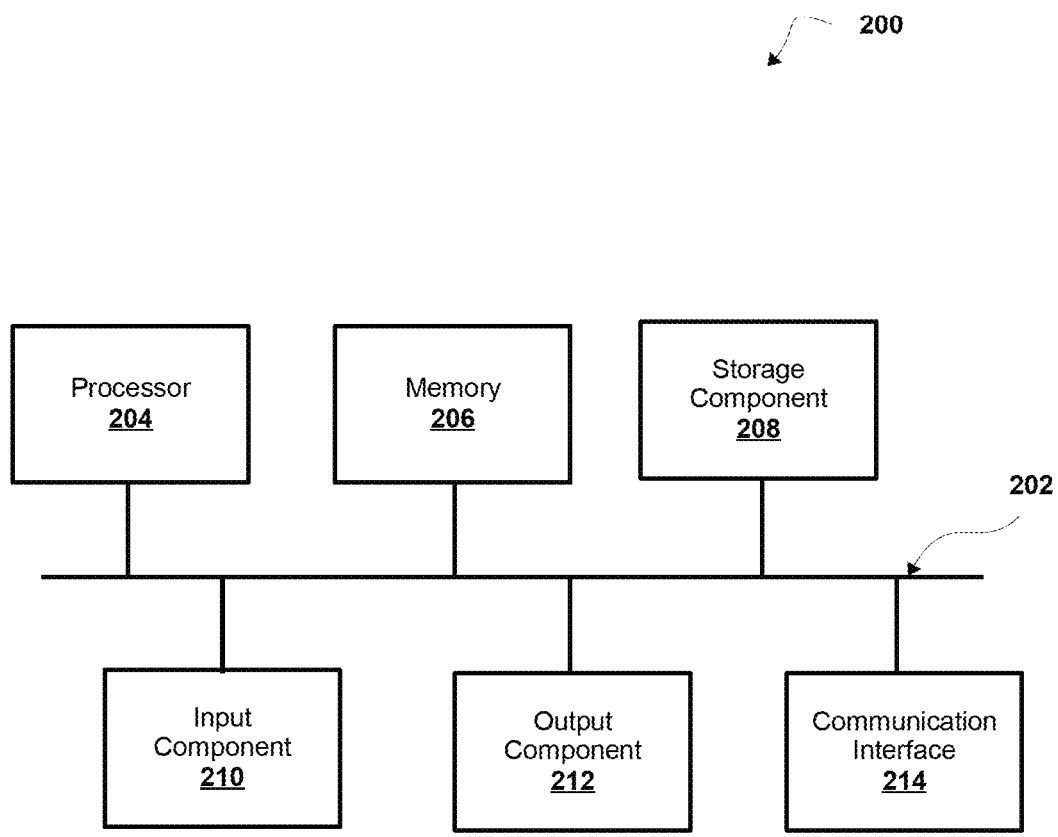
FIG. 2 is a diagram of a non-limiting embodiment of components of one or more devices of FIG. 1.

Referring now to FIG. 2, FIG. 2 is a diagram of example components of a device 200. Device 200 may correspond to transaction service provider system 102, issuer system 104, user device 106, and/or merchant system 108, and/or one or more devices of transaction service provider system 102, issuer system 104, user device 106, and/or merchant system 108. In some non-limiting embodiments, transaction service provider system 102, issuer system 104, user device 106, and/or merchant system 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.), and/or the like, which can be programmed to perform a function. Memory 206 may include a random access memory (RAM), a read only memory (ROM), and/or another type of dynamic or static storage device (e.g., a flash memory, a magnetic memory, an optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi™ interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
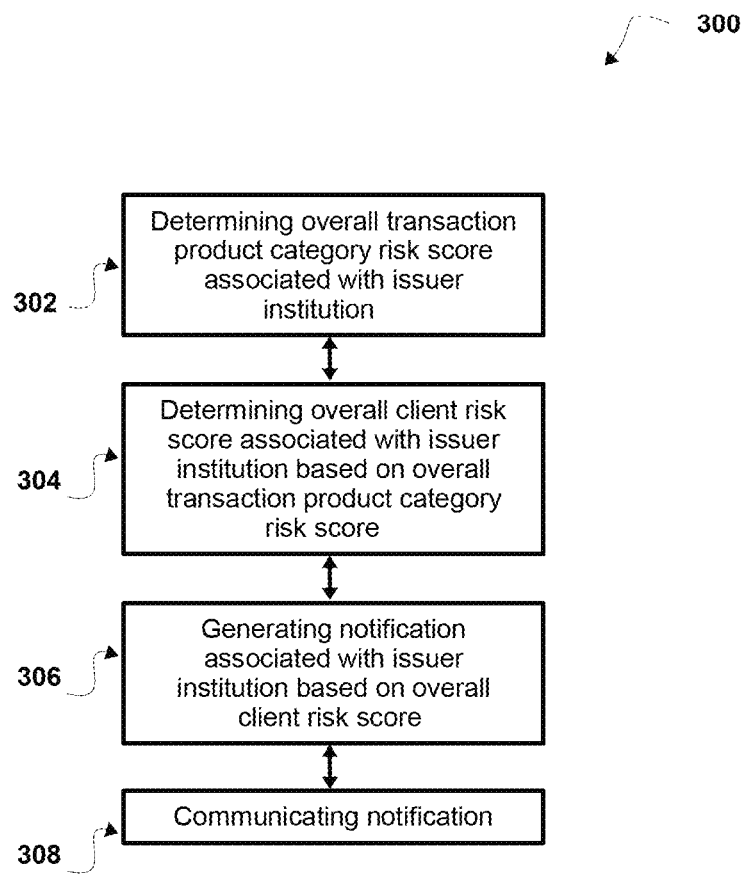
FIG. 3 is a flowchart of a non-limiting embodiment of a process for detecting potential money laundering activities according to the principles of the present invention.

Referring now to FIG. 3, FIG. 3 is a flowchart of a non-limiting embodiment of a process 300 for detecting potential money laundering activities. In some non-limiting embodiments, one or more of the steps of process 300 may be performed (e.g., completely, partially, etc.) by transaction service provider system 102. In some non-limiting embodiments, one or more of the steps of process 300 may be performed (e.g., completely, partially, etc.) by another system, another device, another group of systems, or another group of devices, separate from or including transaction service provider system 102, such as issuer system 104 (e.g., one or more devices of issuer system 104), user device 106, and/or merchant system 108 (e.g., one or more devices of merchant system 108).

As shown in FIG. 3, at step 302, process 300 includes determining an overall issuer institution risk score associated with the at least one issuer institution. For example, transaction service provider system 102 may determine the overall issuer institution risk score associated with the at least one issuer institution. In some non-limiting embodiments, transaction service provider system 102 may determine the overall issuer institution risk score by determining an overall transaction product category risk score associated with the at least one issuer institution for each transaction product category of a plurality of transaction product categories.

In some non-limiting embodiments, transaction service provider system 102 may receive transaction data associated with a plurality of transactions involving an issuer institution (e.g., an issuer institution associated with issuer system 104). For example, transaction service provider system 102 may receive the transaction data based on a plurality of transactions conducted by a plurality of users (e.g., a plurality of users, each associated with a user device 106), where the plurality of transactions include a plurality of transactions involving credit accounts issued by an issuer institution, a plurality of transactions involving debit accounts issued by an issuer institution, a plurality of transactions involving prepaid card accounts issued by an issuer institution, a plurality of transactions involving EFT accounts issued by an issuer institution and/or involving an account (e.g., a credit account, a debit account, and/or the like) issued by an issuer institution. The transaction data may include transaction volume data associated with a transaction volume of the plurality of transactions in each transaction product category of a plurality of transaction product categories.

In some non-limiting embodiments, transaction data associated with a transaction may include a transaction amount of a transaction (e.g., a total cost of the transaction, an individual cost of each product involved in the transaction, and/or the like), transaction identity data associated with an identifier of a transaction (e.g., a unique identifier, a reference number associated with a transaction, a transaction identifier, a transaction ID, a unique transaction identifier (UTI), a merchant order number, and/or the like), timing data associated with a time of a transaction (e.g., a time of day, a time range of a day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like, and/or the like), and/or the like.

Additionally or alternatively, the transaction data may include issuer institution transaction data associated with an issuer institution that issued an account involved in a transaction. In some non-limiting embodiments, the issuer institution transaction data may include issuer institution identity data associated with an identity of the issuer institution (e.g., a unique identifier, a name, an issuer identification number (IIN), a bank identification number (BIN)), and/or the like) that issued an account involved in the transaction. Additionally or alternatively, the issuer institution identity data may be associated with a transaction product category associated with the account involved in the transaction. For example, an IIN and/or a BIN of an issuer institution may identify a transaction product category associated with the account involved in the transaction. In some non-limiting embodiments, first issuer institution identity data may be associated with second issuer institution identity data. For example, a plurality of IINs and/or a plurality of BINs may be associated with an issuer institution name, bank identification (BID), and/or the like. In such an example, a plurality of IINs and/or a plurality of BINs may identify a single issuer institution.

In some non-limiting embodiments, each transaction product category may be a credit transaction product category, a debit transaction product category, a prepaid card transaction product category, and/or an electronic fund transfer (EFT) transaction product category, and/or the like. In some non-limiting embodiments, a credit transaction product category may include transactions (e.g., payment transactions, electronic payment transactions, online payment transactions, a loan transaction, a cash transaction, and/or the like) involving a credit account (e.g., a credit card account, a charge card account, a virtual credit card account, and/or the like) issued by an issuer institution. In some non-limiting embodiments, a debit transaction product category may include transactions (e.g., payment transactions, electronic payment transactions, online payment transactions, a loan transaction, a cash transaction, ATM transactions, ATM card transactions, ATM cash transactions, ATM cash deposit transactions, ATM cash withdrawal transactions, and/or the like) involving a debit account (e.g., a debit card account, a virtual debit card account, and/or the like) issued by an issuer institution. In some non-limiting embodiments, a prepaid card transaction product category may include transactions (e.g., payment transactions, electronic payment transactions, online payment transactions, a loan transaction, a cash transaction, and/or the like) involving a prepaid card account (e.g., an account associated with a prepaid credit card, an account associated with a prepaid debit card, an account associated with a prepaid virtual card, a prepaid virtual credit card account, a prepaid virtual debit card account, and/or the like) issued by an issuer institution. In some non-limiting embodiments, an EFT transaction product category may include EFT transactions (e.g., credit card initiated EFT transfer transactions, debit card initiated EFT transfer transactions, and/or the like) involving an EFT account issued by an issuer institution and/or involving an account (e.g., a credit account, a debit account, and/or the like) issued by an issuer institution.

In some non-limiting embodiments, the overall transaction product category risk score may include an overall risk score associated with the issuer institution, where the overall risk score is based on a transaction product category risk score associated with the issuer institution for each transaction product category, an issuer institution risk score associated with the issuer institution, and a geographic risk score of a geographic location of the issuer institution (e.g., a global region location of the issuer institution, a country location of the issuer institution, an intra country region location of the issuer institution, a state location of the issuer institution, and/or the like).

In some non-limiting embodiments, the transaction product category risk score may include a risk score associated with a credit transaction product category (e.g., a credit card transaction product category, and/or the like), a debit transaction product category (e.g., a debit card transaction product category, and/or the like), a prepaid card transaction product category (e.g., a prepaid credit card transaction product category, a prepaid debit card transaction product category, a prepaid virtual card category, and/or the like), and an EFT transaction product category.

In some non-limiting embodiments, transaction service provider system 102 may determine the transaction product category risk score for each transaction product category of the plurality of transaction product categories (e.g., a credit transaction product category, a debit transaction product category, a prepaid card transaction product category, an EFT transaction product category, and/or the like). For example, transaction service provider system 102 may determine a transaction product category risk score based on a transaction volume of one or more transactions conducted during a predetermined time interval (e.g., a transaction volume of a transaction for a predetermined time interval, a transaction volume of a plurality of transactions for a predetermined time interval, and/or the like) in each transaction product category of the plurality of transaction product categories and a transaction volume range (e.g., a transaction volume range of a plurality of transaction volume ranges) for a predetermined time interval in each transaction product category of the plurality of transaction product categories. In some non-limiting embodiments, the transaction volume may be equal to the sum of the transaction amount for each transaction of a plurality of transactions. In some non-limiting embodiments, the transaction volume may be equal to the transaction amount for a single transaction.

In some non-limiting embodiments, the predetermined time interval of the transaction volume may include a weekly time interval, a biweekly time interval, a monthly time interval, a yearly time interval, and/or the like. In some non-limiting embodiments, the predetermined time interval of the transaction volume range may include a weekly time interval, a biweekly time interval, a monthly time interval, a yearly time interval, and/or the like. In some non-limiting embodiments, the predetermined time interval of the transaction volume may be the same or different as the predetermined time interval of the transaction volume range.

In some non-limiting embodiments, transaction service provider system 102 may determine the transaction volume in each transaction product category based on the transaction data associated with a plurality of transactions (e.g., a plurality of transactions involving the issuer institution conducted during a predetermined interval). For example, transaction service provider system 102 may determine issuer institution identity data (e.g., a name of the issuer institution, an IIN, a BIN, and/or the like) from the transaction data associated with the plurality of transactions, and transaction service provider system 102 may determine whether the issuer institution identity data included in the transaction data corresponds to issuer institution identity data (e.g., predetermined issuer institution identity data) associated with the issuer institution (e.g., issuer institution identity data that identifies the issuer institution and that identifies a transaction product category of the issuer institution). Transaction service provider system 102 may determine a transaction volume of at least one transaction in each transaction product category based on a transaction amount of the at least one transaction having the issuer institution identity data that corresponds to the issuer institution identity data associated with the issuer institution. For example, transaction service provider system 102 may sum the transaction amount of a plurality of transactions having the issuer institution identity data that corresponds to the issuer institution identity data associated with the issuer institution to provide the transaction volume.

In some non-limiting embodiments, transaction service provider system 102 may determine that the transaction volume is within a transaction volume range. For example, transaction service provider system 102 may determine that the transaction volume is equal to an endpoint of a transaction volume range of a plurality of transaction volume ranges or equal to a value between the endpoints of the transaction volume range of a plurality of transaction volume ranges for a transaction product category. Transaction service provider system 102 may assign the transaction product category risk score based on the transaction volume range in which the transaction volume is determined to be within.

In some non-limiting embodiments, transaction service provider system 102 may determine the transaction product category risk score for a transaction product category associated with a credit transaction product category based on Table 1:

TABLE 1

| Transaction Range | Score |
|---|---|
| $1-$1M | 1 |
| $1M-$5M | 2 |
| $5M-$20M | 3 |
| $20M-$100M | 4 |
| $100M-$500M | 5 |
| >$500M | 6 |

As shown in Table 1, each transaction volume range (shown as "Transaction Range" in Table 1) of a plurality of transaction volume ranges may correspond to a transaction product category risk score (shown as "Score" in Table 1). In some non-limiting embodiments, transaction service provider system 102 may assign the transaction product category risk score associated with the issuer institution for the credit transaction product category based on the transaction volume of a plurality of transactions in the credit transaction product category involving the issuer institution and the transaction volume range for the credit transaction product category.

In some non-limiting embodiments, the transaction product category risk score for a transaction product category associated with a debit transaction product category may be calculated based on Table 2:

TABLE 2

| Transaction Range | Score |
|---|---|
| $1-$1M | 1 |
| $1M-$5M | 2 |
| $5M-$10M | 3 |
| $10M-$20M | 4 |
| $20M-$100M | 5 |
| >$100M | 6 |

As shown in Table 2, each transaction volume range (shown as "Transaction Range" in Table 2) of a plurality of transaction volume ranges may correspond to a transaction product category risk score (shown as "Score" in Table 2). In some non-limiting embodiments, transaction service provider system 102 may assign the transaction product category risk score associated with the issuer institution for the debit transaction product category based on the transaction volume of a plurality of transactions in the debit transaction product category involving the issuer institution and the transaction volume range for the debit transaction product category.

In some non-limiting embodiments, the transaction product category risk score for a transaction product category associated with a debit transaction product category may be calculated based on Table 3:

TABLE 3

| Transaction Range | Score |
|---|---|
| $1-$100K | 1 |
| $100K-$1M | 2 |
| $1M-$10M | 3 |
| $10M-$20M | 4 |
| >$20M | 5 |

As shown in Table 3, each transaction volume range (shown as "Transaction Range" in Table 3) of a plurality of transaction volume ranges may correspond to a transaction product category risk score (shown as "Score" in Table 3). In some non-limiting embodiments, transaction service provider system 102 may assign the transaction product category risk score associated with the issuer institution for the prepaid card transaction product category based on the transaction volume of a plurality of transactions in the prepaid card transaction product category involving the issuer institution and the transaction volume range for the prepaid card transaction product category.

In some non-limiting embodiments, the transaction product category risk score for a transaction product category associated with a EFT transaction product category may be calculated based on Table 4:

TABLE 4

| Transaction Range | Score |
|---|---|
| $1-$100K | 1 |
| $100K-$1M | 2 |
| $1M-$8M | 3 |
| >$8M | 4 |

As shown in Table 4, each transaction volume range (shown as "Transaction Range" in Table 4) of a plurality of transaction volume ranges may correspond to a transaction product category risk score (shown as "Score" in Table 4). In some non-limiting embodiments, transaction service provider system 102 may assign the transaction product category risk score associated with the issuer institution for the EFT transaction product category based on the transaction volume of a plurality of transactions in the EFT transaction product category involving the issuer institution and the transaction volume range for the EFT transaction product category.

In some non-limiting embodiments, transaction service provider system 102 may determine the issuer institution risk score associated with the issuer institution based on a predetermined scoring scale based on at least one issuer institution risk parameter associated with the issuer institution. For example, transaction service provider system 102 may determine the issuer institution risk score based on a predetermined scoring scale that includes an exponential scoring scale and/or a weighted scoring scale.

In some non-limiting embodiments, transaction service provider system 102 may determine the issuer institution risk score associated with the issuer institution based on the transaction data associated with the plurality of transactions. For example, transaction service provider system 102 may determine issuer institution identity data included in the transaction data. The issuer institution identity data may be associated with an identifier of the issuer institution involved in the plurality of transactions. Transaction service provider system 102 may assign the issuer institution risk score to the issuer institution based on the issuer institution identity data in the transaction data.

In some non-limiting embodiments, transaction service provider system 102 may determine the geographic risk score associated with the issuer institution based on a predetermined scoring scale based on at least one geographic risk parameter associated with the issuer institution. For example, transaction service provider system 102 may determine the geographic risk score based on a predetermined scoring scale that includes an exponential scoring scale and/or a weighted scoring scale.

In some non-limiting embodiments, transaction service provider system 102 may determine the geographic risk score associated with the issuer institution and/or a geographic location of the issuer institution based on the transaction data associated with the plurality of transactions involving the issuer institution. For example, transaction service provider system 102 may determine issuer institution identity data included in the transaction data. The issuer institution identity data may be associated with an identifier of the issuer institution involved in the plurality of transactions. Transaction service provider system 102 may determine a geographic location of the issuer institution based on the issuer institution identity data and transaction service provider system 102 may assign the issuer institution risk score to the issuer institution based on the geographic location of the issuer institution.

In some non-limiting embodiments, transaction service provider system 102 may determine the overall transaction product category risk score associated with the issuer institution for each transaction product category, wherein the overall transaction product category risk score may be equal to the product of multiplying the transaction product category risk score associated with the issuer institution for a transaction product category, the issuer institution risk score associated with the issuer institution, and the geographic risk score associated with the at least one issuer institution.

In some non-limiting embodiments, transaction service provider system 102 may assign the overall transaction product category risk score to issuer institution identity data associated with the issuer institution. For example, transaction service provider system 102 may assign the overall transaction product category risk score to a BIN associated with the issuer institution.

In some non-limiting embodiments, transaction service provider system 102 may determine a BIN associated with the issuer institution for each transaction of the plurality of transactions, where the BIN for each transaction may be associated with a transaction product category of the plurality of transaction product categories. Additionally, transaction service provider system 102 may determine an overall transaction product category risk score for the BIN associated with each transaction product category of the plurality of transaction product categories. In some non-limiting embodiments, transaction service provider system 102 may determine the transaction volume of the plurality of transactions in each transaction product category of the plurality of transaction product categories. For example, transaction service provider system 102 may determine the transaction volume of the plurality of transactions associated with a BIN for each transaction product category. In some non-limiting embodiments, transaction service provider system 102 may determine the transaction volume of the plurality of transactions in each transaction product category of the plurality of transaction product categories based on receiving the transaction data associated with the plurality of transactions involving the issuer institution. In some non-limiting embodiments, transaction service provider system 102 may determine the overall transaction product category risk score associated with the at least one issuer institution for each transaction product category of the plurality of transaction product categories based on determining the transaction volume of the plurality of transactions in each transaction product category.

In some non-limiting embodiments, transaction service provider system 102 may determine the overall transaction product category risk score associated with the issuer institution based on the formula shown in Table 5:

TABLE 5

IF([Country Rating] = "Weak" AND [Client Rating] = "High")
THEN ([Weak] * [High] * [Transaction Rating])
ELSEIF([Country Rating] = "Moderate" AND [Client Rating] = "High")
THEN ([Moderate] * [High] * [Transaction Rating])
ELSEIF([Country Rating] = "Adequate" AND [Client Rating] = "High")
THEN ([Adequate] * [High] * [Transaction Rating])
ELSEIF([Country Rating] = "Weak" AND [Client Rating] = "Medium")
THEN ([Weak] * [Medium] * [Transaction Rating])
ELSEIF([Country Rating] = "Moderate" AND [Client Rating] = "Medium")
THEN ([Moderate] * [Medium] * [Transaction Rating])
ELSEIF([Country Rating] = "Adequate" AND [Client Rating] = "Medium")
THEN ([Adequate] * [Medium] * [Transaction Rating])
ELSEIF([Country Rating] = "Weak" AND [Client Rating] = "Low")
THEN ([Weak] * [Low] * [Transaction Rating])
ELSEIF([Country Rating] = "Moderate" AND [Client Rating] = "Low")
THEN ([Moderate] * [Low] * [Transaction Rating])
ELSEIF([Country Rating] = "Adequate" AND [Client Rating] = "Low")
THEN ([Adequate] * [Low] * [Transaction Rating])
ELSE 1/10
END risk parameter that has a value of moderate. Transaction service provider system 102 may assign a geographic risk score of 0.1 based on a geographic risk parameter that has a value of adequate. In the above example, transaction service provider system 102 may determine whether the at least one issuer institution risk parameter associated with the issuer institution is high, medium (e.g., elevated), or low. Transaction service provider system 102 may assign an issuer institution risk score of 5 based on an issuer institution risk parameter that has a value of high. Transaction service provider system 102 may assign an issuer institution risk score of 1 based on an issuer institution risk parameter that has a value of medium. Transaction service provider system 102 may assign an issuer institution risk score of 0.1 based on an issuer institution risk parameter that has a value of low. Based on the value of an issuer institution risk parameter and a geographic risk parameter, transaction service provider system 102 may multiply the transaction product category risk score by the geographic risk score associated with the value of the geographic risk parameter and the issuer institution risk score associated with the value of the issuer institution risk parameter.

In some non-limiting embodiments, transaction service provider system 102 may determine the overall transaction product category risk score associated with the issuer institution and assign the overall transaction product category risk score as shown in Table 6:

TABLE 6

| Geographic Location | Geographic Risk Parameter | Issuer Institution Risk Parameter | Issuer Institution Name | BIN | Transaction Volume | Overall Transaction Product Category Risk Score |
|---|---|---|---|---|---|---|
| Belarus | Weak | High | Belarus Bank North | 434555 | $37.6M | 100.0 |
|  |  |  | Belarus Bank East | 408554 | $6.4M | 75.0 |
|  |  | Medium | Belarus Bank West | 416554 | $1.1M | 10.0 |
| Australia | Moderate | High | Australia Bank North | 456446 | $0.4M | 5.0 |
|  |  | Medium | Australia Bank East | 474445 | $257.1M | 5.0 |
|  |  |  | Australia Bank South | 430444 | $227.9M | 5.0 |
| Jordan | Adequate | High | Jordan Bank North | 470887 | $0.0M | 0.5 |
|  |  |  | Jordan Bank West | 474886 | $11.5M | 1.0 |
|  |  | Medium | Jordan Bank South | 411885 | $0.5M | 0.1 |

As shown in Table 5, the at least one issuer institution risk parameter associated with the issuer institution is shown as "Client Rating" and the at least one geographic risk parameter associated with the issuer institution is shown as "Country Rating". As further shown in Table 5, transaction service provider system 102 may determine whether the at least one geographic risk parameter associated with the issuer institution is high, medium (e.g., elevated), or low. Transaction service provider system 102 may assign a geographic risk score of 5 based on a geographic risk parameter that has a value of weak. Transaction service provider system 102 may assign a geographic risk score of 1 based on a geographic As shown in Table 6, transaction service provider system 102 may associate the geographic location of an issuer institution, a geographic risk parameter for the issuer institution, an issuer institution risk parameter for the issuer institution, first issuer institution identity data associated with the issuer institution (e.g., a name of the issuer institution, "Issuer Institution Name" as shown in Table 6), second issuer institution identity data associated with the issuer institution (e.g., a BIN, "BIN" as shown in Table 6), a transaction volume for a plurality of transactions in a transaction product category, and an overall transaction product category risk score for the transaction product category. In some non-limiting embodiments, transaction service provider system 102 may associate one or more second issuer institution identity data associated with the issuer institution (e.g., one or more IINs, one or more BINs) with first issuer institution identity data associated with the issuer institution (e.g., a name of the issuer institution). For example, an IIN and/or a BIN may be indicative of an issuer institution and a transaction product category of the issuer institution. Therefore, one or more IINs and/or one or more BINs may be associated with a name of an issuer institution.

As further shown in FIG. 3, at step 304, process 300 includes determining an overall client risk score associated with the issuer institution based on the overall transaction product category risk score. For example, transaction service provider system 102 may determine the overall client risk score associated with the issuer institution based on the overall transaction product category risk score.

In some non-limiting embodiments, transaction service provider system 102 may determine the overall issuer institution risk score, where the overall issuer institution risk score may be equal to an average (e.g., a mean, a median, or a mode) of a plurality of overall transaction product category risk scores. For example, transaction service provider system 102 may determine an average of the plurality of overall transaction product category risk scores, where the plurality of overall transaction product category risk scores includes the overall transaction product category risk score for each transaction product category of the plurality of transaction product categories.

In some non-limiting embodiments, transaction service provider system 102 may generate a map, a chart, a graph, a diagram, and/or the like, of a plurality of overall issuer institution risk scores associated with a plurality of issuer institutions. For example, transaction service provider system 102 may generate a chart that illustrates a ranking (e.g., a ranking of highest to lowest, a ranking of lowest to highest, and/or the like) of the plurality of overall issuer institution risk scores associated with the plurality of issuer institutions.

In some non-limiting embodiments, transaction service provider system 102 may generate a map that includes an overall geographic risk score for a plurality of issuer institutions in a plurality of geographic locations. For example, transaction service provider system 102 may determine an average (e.g., a mean, a median, or a mode) of a plurality of overall issuer institution risk scores associated with a plurality of issuer institutions located in a first geographic location to provide a first overall geographic risk score for the first geographic location. Transaction service provider system 102 may determine an average of a plurality of overall issuer institution risk scores associated with a plurality of issuer institutions located in a second geographic location to provide a second overall geographic risk score for the second geographic location. Transaction service provider system 102 may generate a map comprising the first geographic location and the second geographic location, where the map comprises a first indication (e.g., a first visual indication, a first color, a first ranking, and/or the like) associated with the first overall geographic risk score for the first geographic location and a second indication (e.g., a second visual indication, a second color, a second ranking, and/or the like) associated with the second overall geographic risk score for the second geographic location. Transaction service provider system 102 may generate the map to include additional indications associated with additional overall geographic risk scores for additional geographic locations.

In some non-limiting embodiments, transaction service provider system 102 may generate a map that includes groupings of geographic locations based on overall geographic risk scores for the geographic locations. For example, transaction service provider system 102 may generate a map that includes a first group of a plurality of geographic locations having overall geographic risk scores within a first predetermined range, a second group of a plurality of geographic locations having overall geographic risk scores within a second predetermined range, and a third group of a plurality of geographic locations having overall geographic risk scores within a third predetermined range. Transaction service provider system 102 may generate the map to include additional groups of geographic locations having overall geographic locations within additional predetermined ranges.

Figure 4:
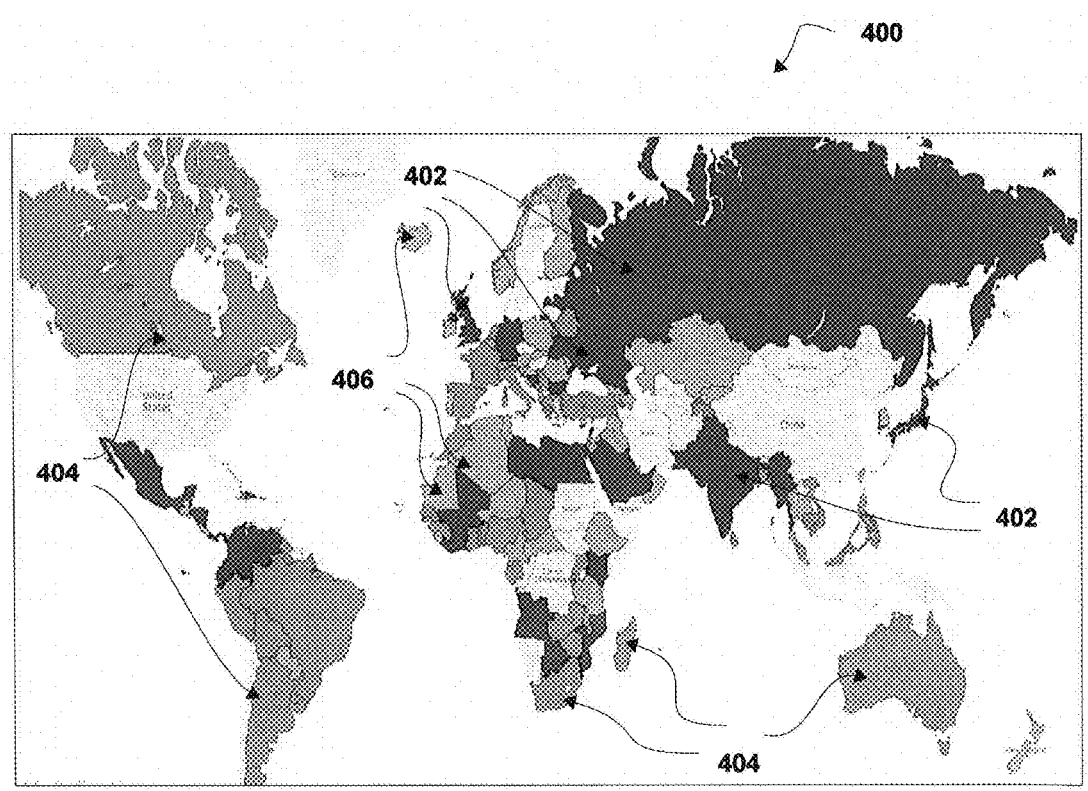
FIG. 4 is a non-limiting embodiment of map generated as part of the process shown in FIG. 3.

As shown in FIG. 4, a map 400 illustrates a first group of a plurality of geographic locations 402 having overall geographic risk scores within a first predetermined range, a second group of a plurality of geographic locations 404 having overall geographic risk scores within a second predetermined range, and a third group of a plurality of geographic locations 406 having overall geographic risk scores within a third predetermined range.

Referring back to FIG. 3, as further shown in FIG. 3, at step 306, process 300 includes generating a notification associated with the issuer institution based on the overall client risk score associated with the issuer institution. For example, transaction service provider system 102 may generate the notification (e.g., a notification message, an alert, a warning, and/or the like) associated with the issuer institution based on the overall client risk score associated with the issuer institution.

In some non-limiting embodiments, transaction service provider system 102 may determine whether the overall issuer institution risk score associated with the issuer institution satisfies a threshold value (e.g., a threshold value of an overall issuer institution risk score). For example, transaction service provider system 102 may determine that the overall issuer institution risk score associated with the issuer institution satisfies or does not satisfy a threshold value. In some non-limiting embodiments, transaction service provider system 102 may generate the notification associated with the issuer institution based on determining that the overall issuer institution risk score satisfies or does not satisfy the threshold value.

In some non-limiting embodiments, transaction service provider system 102 may generate the notification associated with the at least one issuer institution based on at least one issuer institution risk notification rule and at least one of a cross border transaction ratio (e.g., a percentage of cross border transactions) associated with the at least one issuer institution for a predetermined time interval, a transaction volume (e.g., an overall transaction volume) of all transactions in the plurality of transaction product categories for a predetermined time interval, a transaction volume (e.g., an overall transaction volume) of all transactions in a transaction product category of the plurality of transaction product categories for a predetermined time interval, a transaction volume (e.g., an overall transaction volume) of all transactions in a subcategory of a transaction product category (e.g., a subcategory of a credit transaction product category, a subcategory of a debit transaction product category, a subcategory of a prepaid card transaction product category, a subcategory of an EFT transaction product category, ATM transactions of a debit transaction product category, ATM cash transactions of a debit transaction product category, and/or the like) of the plurality of transaction product categories for a predetermined time interval, and/or any combination thereof.

In some non-limiting embodiments, the cross border ratio comprises cross border transaction data associated with a number of transactions involving the issuer institution that are conducted (e.g., conducted during a predetermined time interval) between a first geographic location boundary and a second geographic location boundary compared to overall transaction data associated with an overall number of transactions involving the issuer institution (e.g., an overall number of transactions, which involve the issuer institution, in all transaction product categories). In some non-limiting embodiments, the cross border transaction data may include a transaction volume (e.g., a cross border transaction volume) of the number of transactions that are conducted between the first geographic location boundary and the second geographic location boundary during a predetermined time interval. Additionally, the overall transaction data may include a transaction volume (e.g., an overall transaction volume) of a number of transactions involving the at least one issuer institution conducted during the predetermined time interval (e.g., all transactions involving the at least one issuer institution conducted during the predetermined time interval).

In some non-limiting embodiments, the at least one issuer institution risk notification rule may include issuer institution risk notification rule criteria. The issuer institution risk notification rule criteria may include at least one threshold value of a cross border transaction ratio associated with the at least one issuer institution for a predetermined time interval, at least one threshold value of a transaction volume (e.g., a first threshold value of an overall transaction volume) of all transactions in the plurality of transaction product categories for a predetermined time interval, at least one threshold value of a transaction volume (e.g., a second threshold value of an overall transaction volume) of all transactions in a transaction product category of the plurality of transaction product categories for a predetermined time interval, at least one threshold value of a transaction volume (e.g., a third threshold value of an overall transaction volume) of all transactions in subcategory of a transaction product category (e.g., a subcategory of a credit transaction product category, a subcategory of a debit transaction product category, a subcategory of a prepaid card transaction product category, a subcategory of an EFT transaction product category, ATM transactions of a debit transaction product category, ATM cash transactions of a debit transaction product category, and/or the like) of the plurality of transaction product categories for a predetermined time interval, and/or any combination thereof.

In some non-limiting embodiments, the issuer institution risk notification rule criteria may include a threshold value of a cross border transaction ratio that is associated with a threshold value of an overall transaction volume of all transactions in the plurality of transaction product categories, a threshold value of an overall transaction volume of all transactions in a transaction product category of the plurality of transaction product categories, and/or a threshold value of an overall transaction volume of all transactions in a subcategory of a transaction product category of the plurality of transaction product categories. For example, the issuer institution risk notification rule criteria may include a threshold value of a cross border transaction ratio associated with a threshold value of an overall transaction volume of all transactions in the plurality of transaction product categories so that to satisfy the issuer institution risk notification rule criteria, the threshold value of the cross border transaction ratio and the threshold value of the overall transaction volume of all transactions in the plurality of transaction product categories must be satisfied.

In some non-limiting embodiments, transaction service provider system 102 may determine whether a cross border transaction ratio associated with the issuer institution (e.g., for a predetermined time interval), a transaction volume of all transactions in the plurality of transaction product categories (e.g., for a predetermined time interval), a transaction volume of all transactions in a transaction product category of the plurality of transaction product categories (e.g., for a predetermined time interval), and/or a transaction volume of all transactions in subcategory of a transaction product category of the plurality of transaction product categories (e.g., for a predetermined time interval), satisfy a threshold value as described herein.

In some non-limiting embodiments, the issuer institution risk notification rule criteria may include a geographic location exclusion parameter and/or a geographic location inclusion parameter. For example, the geographic location exclusion parameter may prevent notifications associated with one or more issuer institutions located in a geographic location from being generated based on a transaction volume in one or more transaction product categories of the plurality of transaction categories being greater than or less than a predetermined amount. The geographic location inclusion parameter may require notifications associated with one or more issuer institutions located in a geographic location (e.g., located only in a single geographic location) to be generated based on a transaction volume in one or more transaction product categories of the plurality of transaction categories being greater than or less than a predetermined amount.

In some non-limiting embodiments, transaction service provider system 102 may utilize a model to determine issuer institution risk notification rule criteria. For example, transaction service provider system 102 may utilize a machine learning model, a pattern matching model, an issuer institution risk notification model (e.g., a customized model developed for a particular set of issuer institutions, such as a particular set of issuer institutions being associated with similar transaction data), and/or the like. In such an example, transaction service provider system 102 may utilize the model to process transaction data, issuer institution data, or a combination thereof, and determine whether to generate a notification associated with an issuer institution and/or determine a set of parameters (e.g., issuer institution risk notification rule criteria of an issuer institution risk notification rule) associated with determining whether to generate a notification. In some implementations, transaction service provider system 102 may obtain the model from a data storage device. For example, transaction service provider system 102 may generate (e.g., automatically) the machine learning model for determining a set of parameters associated with determining to generate a notification, and may store the machine learning model via a data structure for utilization in a response to a request for data identifying the set of parameters associated with determining to generate a notification.

In some implementations, transaction service provider system 102 may generate a model to determine whether to generate a notification and/or determine a set of parameters associated with determining whether to generate a notification. For example, when transaction service provider system 102 determines to utilize a machine learning model, transaction service provider system 102 may utilize a first portion of past transaction data as a training set for determining whether to generate a notification and/or determining a set of parameters associated with determining whether to generate a notification, and transaction service provider system 102 may utilize a second portion of past transaction data as a validation set (e.g., for validating accuracy of a determination whether to generate a notification and/or a determination of a set of parameters associated with determining whether to generate a notification). In the example above, transaction service provider system 102 may apply the machine learning model to the transaction data of at least one transaction involving the issuer institution to determine whether to generate a notification.

Machine learning techniques used to generate the model may include, for example, supervised and/or unsupervised techniques, such as those involving artificial neural networks, association rule learning, Bayesian networks, clustering, deep learning, decision trees, genetic algorithms, Hidden Markov Modeling, inductive logic programming, learning automata, learning classifier systems, logistic regressions, linear classifiers, quadratic classifiers, reinforcement learning, representation learning, rule-based machine learning, similarity and metric learning, sparse dictionary learning, support vector machines, and/or the like. In some non-limiting embodiments, the training data used to train the machine learning model may be different from the training data used to validate the machine learning model.

In some non-limiting embodiments, the notification may include transaction data and/or issuer institution identity data associated with the issuer institution. For example, the notification may include transaction volume data associated with a transaction volume of a plurality of transactions in a transaction product category. Additionally or alternatively, the transaction product category may be associated with an IIN and/or a BIN of the issuer institution in the notification.

As further shown in FIG. 3, at step 308, process 300 includes communicating the notification. For example, transaction service provider system 102 may communicate the notification based on generating the notification. In some non-limiting embodiments, transaction service provider system 102 may communicate the notification to a client device associated with the issuer institution (e.g., a client device of issuer system 104). For example, transaction service provider system 102 may communicate a client device associated with the issuer institution based on a geographic location of the issuer institution.

In some non-limiting embodiments, transaction service provider system 102 may cause (e.g., trigger) at least one remedial action associated with the issuer institution to occur. For example, transaction service provider system 102 may cause at least one remedial action associated with the issuer institution to occur based on communicating the notification to the issuer institution. In some non-limiting embodiments, transaction service provider system 102 may prevent at least one transaction involving an account issued by the issuer institution from being processed.

In some non-limiting embodiments, the at least one remedial action may include preventing at least one transaction associated with the issuer institution from being processed. For example, the at least one remedial action may include preventing at least one transaction associated with the issuer institution from being processed based on a transaction amount of the at least one transaction satisfying a threshold value, based on a transaction volume of the at least one transaction satisfying a threshold value, based on the transaction being in a predetermined transaction product category, based on a time of the at least one transaction being within a predetermined time interval of a prior transaction, and/or any combination thereof.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for detecting potential money laundering activities, comprising:

receiving transaction data associated with a plurality of transactions involving a plurality of issuer institutions located in a plurality of geographic locations;

determining a transaction volume of a plurality transactions in each transaction product category of a plurality of transaction product categories;

determining a bank identification number (BIN) associated with each of the plurality of issuer institutions for each transaction of the plurality of transactions, wherein the BIN for each transaction is associated with a second transaction product category of the plurality of transaction product categories;

determining an overall transaction product category risk score associated with each of the plurality of issuer institutions for each transaction product category of the plurality of transaction product categories, wherein the overall transaction product category risk score is based on:

the transaction data, a transaction product category risk score associated with each issuer institution for each transaction product category, wherein the transaction product category risk score is based on a transaction volume of a plurality of transactions in each transaction product category and a transaction volume range for each transaction product category of the plurality of transaction product categories, an issuer institution risk score associated with each of the plurality of issuer institutions, and a geographic risk score associated with each of the plurality of issuer institutions based on a geographic location of each of the plurality of issuer institutions; and wherein determining the overall transaction product category risk score associated with each of the plurality of issuer institutions for each transaction product category of the plurality of transaction product categories comprises:

determining the overall transaction product category risk score for the BIN associated with the second transaction product category of the plurality of transaction product categories;

determining an overall issuer institution risk score associated with each of the plurality of issuer institutions, wherein determining the overall issuer institution risk score comprises:

determining an average of a plurality of overall transaction product category risk scores, wherein the plurality of overall transaction product category risk scores comprises the overall transaction product category risk score for each transaction product category of the plurality of transaction product categories, wherein the overall issuer institution risk score comprises the average of the plurality of overall transaction product category risk scores;

determining an average of a plurality of overall issuer institution risk scores associated with a first plurality of issuer institutions of the plurality of issuer institutions located in a first geographic location to provide a first overall geographic risk score for the first geographic location;

determining an average of a plurality of overall issuer institution risk scores associated with a second plurality of issuer institutions of the plurality of issuer institutions located in a second geographic location to provide a second overall geographic risk score for the second geographic location;

generating a map comprising the first geographic location and the second geographic location, wherein the map comprises a first indication associated with the first overall geographic risk score for the first geographic location and a second indication associated with the second overall geographic risk score for the second geographic location:

determining whether the overall issuer institution risk score associated with at least one issuer institution satisfies a threshold value;

generating a notification associated with the at least one issuer institution based on at least one issuer institution risk notification rule and at least one of the following:

the first overall geographic risk score for the first geographic location displayed in the map;

a cross border transaction ratio associated with the at least one issuer institution, wherein the cross border transaction ratio comprises cross border transaction data associated with a number of transactions involving the at least one issuer institution that are conducted between a first geographic location boundary and a second geographic location boundary compared to overall transaction data associated with the plurality of transactions involving at least one issuer institution, a transaction volume of all transactions in the plurality of transaction product categories, a transaction volume of at least a portion of transactions in a first transaction product category of the plurality of transaction product categories, or any combination thereof, wherein generating the notification associated with the at least one issuer institution comprises generating the notification based on determining that the overall issuer institution risk score satisfies the threshold value; and communicating the notification to a client device based on generating the notification; and causing at least one remedial action associated with the at least one issuer institution to occur based on communicating the notification, wherein causing the at least one remedial action associated with the at least one issuer institution to occur comprises:

preventing at least one transaction involving the at least one issuer institution from being processed based on the map.

2. The method of claim 1, wherein each transaction product category of the plurality of transaction product categories comprises at least one of the following:

a credit transaction product category,
a debit transaction product category,
a prepaid card transaction product category,
an electronic fund transfer (EFT) transaction product category, or
any combination thereof.

3. The method of claim 1, further comprising:
determining the geographic location of the at least one issuer institution based on the transaction data;
wherein the client device is associated with the at least one issuer institution, and wherein communicating the notification to the client device comprises:
communicating the notification to the client device associated with the at least one issuer institution based on the geographic location of the at least one issuer institution.

4. The method of claim 1, wherein the geographic location comprises a country, and wherein the first geographic location boundary comprises a boundary of a first country and the second geographic location boundary comprises a boundary of a second country.

5. The method of claim 1, further comprising:
determining a bank identification number (BIN) associated with the at least one issuer institution for each transaction of the plurality of transactions, wherein the BIN for each transaction is associated with a second transaction product category of the plurality of transaction product categories; and
wherein determining the overall transaction product category risk score associated with the at least one issuer institution for each transaction product category of the plurality of transaction product categories comprises:
determining the overall transaction product category risk score for the BIN associated with the second transaction product category of the plurality of transaction product categories.

6. The method of claim 1, wherein the at least one issuer institution is a plurality of issuer institutions located in a plurality of geographic locations, the method further comprising:
determining an average of a plurality of overall issuer institution risk scores associated with a plurality of issuer institutions located in a first geographic location to provide a first overall geographic risk score for the first geographic location;
determining an average of a plurality of overall issuer institution risk scores associated with a plurality of issuer institutions located in a second geographic location to provide a second overall geographic risk score for the second geographic location; and
generating a map comprising the first geographic location and the second geographic location, wherein the map comprises a first indication associated with the first overall geographic risk score for the first geographic location and a second indication associated with the second overall geographic risk score for the second geographic location.

7. The method of claim 1, further comprising:
determining the transaction volume of the plurality of transactions in each transaction product category.

8. The method of claim 1, further comprising:
causing at least one remedial action associated with the at least one issuer institution to occur based on communicating the notification.

9. The method of claim 1, wherein the cross border transaction data comprises a cross border transaction volume of the number of transactions that are conducted between the first geographic location boundary and the second geographic location boundary during a predetermined time interval, and wherein the overall transaction data comprises an overall transaction volume of the plurality of transactions involving the at least one issuer institution that are conducted during the predetermined time interval.

10. The method of claim 1, wherein generating the notification associated with the at least one issuer institution comprises:
generating the notification associated with the at least one issuer institution based on at least one issuer institution risk notification rule and the following:
a cross border transaction ratio of a plurality of transactions involving the at least one issuer institution, wherein the cross border transaction ratio comprises cross border transaction data associated with a plurality of transactions that are conducted between a first geographic location boundary and a second geographic location boundary compared to the transaction data associated with the plurality of transactions involving the at least one issuer institution,
an overall transaction of the plurality of transaction product categories, and
an overall transaction of a subcategory of a first transaction product category of the plurality of transaction product categories.

11. The method of claim 10, wherein the transaction volume of the subcategory of the first transaction product category comprises a transaction volume of all automated teller machine (ATM) cash transactions involving the at least one issuer institution and conducted during a predetermined time interval.

12. The method of claim 1, further comprising:
determining a transaction volume of all transactions in a subcategory of the first transaction product category of the plurality of transaction product categories;
wherein generating the notification associated with the at least one issuer institution comprises:
generating the notification associated with the at least one issuer institution so that the notification comprises the transaction volume of all transactions in the subcategory of the first transaction product category.

13. A system for detecting potential money laundering activities, comprising:
at least one processor programmed or configured to:
determine an overall transaction product category risk score associated with each of a plurality of issuer institutions located in a plurality of geographic locations for each transaction product category of a plurality of transaction product categories, wherein the overall transaction product category risk score is based on:
transaction data associated with a plurality of transactions involving each of the plurality of issuer institutions, wherein the transaction data comprises a transaction volume of a plurality of transactions in each transaction product category of a plurality of transaction product categories,
a transaction product category risk score associated with each issuer institution for each transaction product category, wherein the transaction product category risk score is based on the transaction volume of the plurality of transactions in each transaction product category and a transaction volume range for each transaction product category of the plurality of transaction product categories,
at least one issuer institution risk score associated with each of the plurality of issuer institutions, and
a geographic risk score associated with each of the plurality of issuer institutions based on the geographic location of each of the plurality of issuer institutions; and
determine an overall issuer institution risk score associated with each of the plurality of issuer institutions based on determining the overall transaction product category risk score, wherein the at least one processor, when determining the overall issuer institution risk score associated with the at least one issuer institution, is programmed or configured to:
determine an average of a plurality of overall transaction product category risk scores, wherein the plurality of overall transaction product category risk scores comprises the overall transaction product category risk score for each transaction product category of the plurality of transaction product categories, wherein the overall issuer institution risk score comprises the average of the plurality of overall transaction product category risk scores;
determine an average of a plurality of overall issuer institution risk scores associated with a first plurality of issuer institutions of the plurality of issuer institutions located in a first geographic location to provide a first overall geographic risk score for the first geographic location;
determine an average of a plurality of overall issuer institution risk scores associated with a second plurality of issuer institutions of the plurality of issuer institutions located in a second geographic location to provide a second overall geographic risk score for the second geographic location;
generate a map comprising the first geographic location and the second geographic location, wherein the map comprises a first indication associated with the first overall geographic risk score for the first geographic location and a second indication associated with the second overall geographic risk score for the second geographic location;
determine that the overall issuer institution risk score associated with at least one issuer institution satisfies a threshold value;
generate a notification associated with the at least one issuer institution based on at least one issuer institution risk notification rule and at least one of the following:
the first overall geographic risk score for the first geographic location displayed in the map;
a cross border transaction ratio of transactions associated with the at least one issuer institution, wherein the cross border transaction ratio of transactions comprises cross border transaction data associated with a number of transactions that are conducted between a first geographic location boundary and a second geographic location boundary compared to overall transaction data associated with an overall number of transactions conducted by the at least one issuer institution,
a first transaction volume of all transactions in the plurality of transaction product categories, a second transaction volume of all transactions for a subcategory of a first transaction product category, or any combination thereof; and communicate the notification to the at least one issuer institution after determining that the overall issuer institution risk score associated with the at least one issuer institution satisfies the threshold value;

cause at least one remedial action associated with the at least one issuer institution to occur based on communicating the notification, wherein when causing the at least one remedial action associated with the at least one issuer institution to occur, the at least one processor is programmed or configured to:

prevent at least one transaction involving the at least one issuer institution from being processed based on the map.

14. The system of claim 13, wherein the at least one processor is further programmed or configured to:

receive the transaction data associated with the plurality of transactions involving the at least one issuer institution; and determine the transaction volume of the plurality of transactions in each transaction product category of the plurality of transaction product categories based on receiving the transaction data; and wherein the at least on processor, when determining the overall transaction product category risk score, is programmed or configured to:

determine the overall transaction product category risk score associated with the at least one issuer institution for the plurality of transaction product categories based on determining the transaction volume of the plurality of transactions in each transaction product category.

15. The system of claim 13, wherein each transaction product category of the plurality of transaction product categories comprises at least one of the following:

a credit transaction product category, a debit transaction product category, a prepaid card transaction product category, an electronic fund transfer (EFT) transaction product category, or any combination thereof.

16. The system of claim 14, wherein the at least one processor is further programmed or configured to:

determine the geographic location of the at least one issuer institution based on the transaction data; and wherein the at least one processor, when communicating the notification to the at least one issuer institution, is programmed or configured to:

communicate the notification to the at least one issuer institution based on the geographic location of the at least one issuer institution.

17. A computer program product for detecting potential money laundering activities, the computer program product comprising one or more computer-readable mediums storing instructions comprising:

one or more instructions that, when executed by at least one processor, cause the at least one processor to:

determine an overall transaction product category risk score associated with each of a plurality of issuer institutions located in a plurality of geographic locations for each transaction product category of a plurality of transaction product categories, wherein the overall transaction product category risk score is based on:

transaction data associated with a plurality of transactions involving each of the plurality of issuer institutions, wherein the transaction data comprises a transaction volume of a plurality of transactions in each transaction product category of a plurality of transaction product categories, a transaction product category risk score associated with each issuer institution for each transaction product category, wherein the transaction product category risk score is based on the transaction volume of the plurality of transactions in each transaction product category and a transaction volume range for each transaction product category of the plurality of transaction product categories, at least one issuer institution risk score associated with each of the plurality of issuer institutions, and a geographic risk score associated with each of the plurality of issuer institutions based on the geographic location of each of the plurality of issuer institutions;

determine an overall issuer institution risk score associated with each of the plurality of issuer institutions based on determining the overall transaction product category risk score, wherein the one or more instructions, that cause the at least one processor to determine the overall issuer institution risk score associated with the at least one issuer institution, cause the at least one processor to:

determine an average of a plurality of overall transaction product category risk scores, wherein the plurality of overall transaction product category risk scores comprises the overall transaction product category risk score for each transaction product category of the plurality of transaction product categories, wherein the overall issuer institution risk score comprises the average of the plurality of overall transaction product category risk scores;

determine an average of a plurality of overall issuer institution risk scores associated with a first plurality of issuer institutions of the plurality of issuer institutions located in a first geographic location to provide a first overall geographic risk score for the first geographic location;

determine an average of a plurality of overall issuer institution risk scores associated with a second plurality of issuer institutions of the plurality of issuer institutions located in a second geographic location to provide a second overall geographic risk score for the second geographic location;

generate a map comprising the first geographic location and the second geographic location, wherein the map comprises a first indication associated with the first overall geographic risk score for the first geographic location and a second indication associated with the second overall geographic risk score for the second geographic location;

determine that the overall issuer institution risk score associated with at least one issuer institution satisfies a threshold value;

generate a notification associated with the at least one issuer institution based on at least one issuer institution risk notification rule and at least one of the following:

the first overall geographic risk score for the first geographic location displayed in the map;

a cross border transaction ratio of transactions associated with the at least one issuer institution, wherein the cross border ratio of transactions comprises cross border transaction data associated with a plurality of transactions that are conducted between a first geographic location boundary and a second geographic location boundary compared to overall transaction data associated with an overall number of transactions conducted by the at least one issuer institution, a first transaction volume of all transactions in the plurality of transaction product categories, a second transaction volume of all transactions in a first transaction product category of the plurality of transaction product categories, or any combination thereof;

communicate the notification to a client device based on generating the notification associated with the at least one issuer institution; and cause at least one remedial action associated with the at least one issuer institution to occur based on communicating the notification, wherein when causing the at least one remedial action associated with the at least one issuer institution to occur, the at least one processor is programmed or configured to:

prevent at least one transaction involving the at least one issuer institution from being processed based on the map.

18. The computer program product of claim 17, wherein the one or more instructions, that cause the at least one processor to generate the notification associated with the at least one issuer institution, cause the at least one processor to:

generate the notification associated with the at least one issuer institution based on the at least one issuer institution risk notification rule and the following:

the cross border transaction ratio of transactions associated with the at least one issuer institution, the first transaction volume, and the second transaction volume.

* * * * *

UNITED STATES PATENT AND TRADEMARK OFFICE
CERTIFICATE OF CORRECTION

PATENT NO. : 10,607,227 B2  
APPLICATION NO. : 15/673912  
DATED : March 31, 2020  
INVENTOR(S) : Karthik Venkatesh et al.

Page 1 of 1

It is certified that error appears in the above-identified patent and that said Letters Patent is hereby corrected as shown below:

On the Title Page

Column 1, Item (73), Assignee, Line 1, delete "Services" and insert -- Service --

In the Claims

Column 30, Line 22, Claim 1, after "plurality" insert -- of --

Signed and Sealed this
Ninth Day of June, 2020

Andrei Iancu
*Director of the United States Patent and Trademark Office*